Sept. 23, 1930.  R. D. WESLEY  1,776,378
AEROPLANE CONTROL
Filed Oct. 25, 1929  5 Sheets-Sheet 2
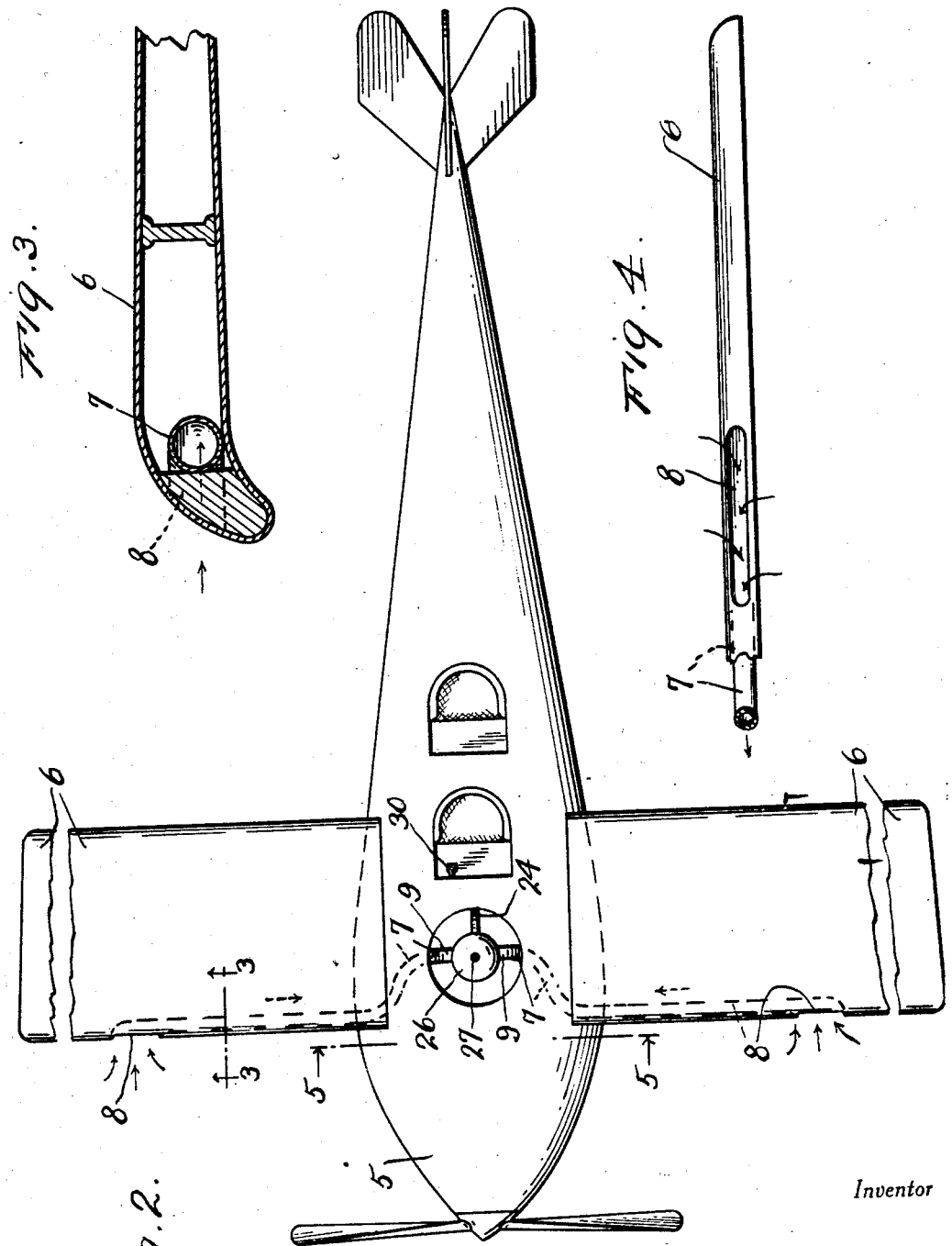
Inventor
R. D. Wesley
By Clarence A. O'Brien
Attorney

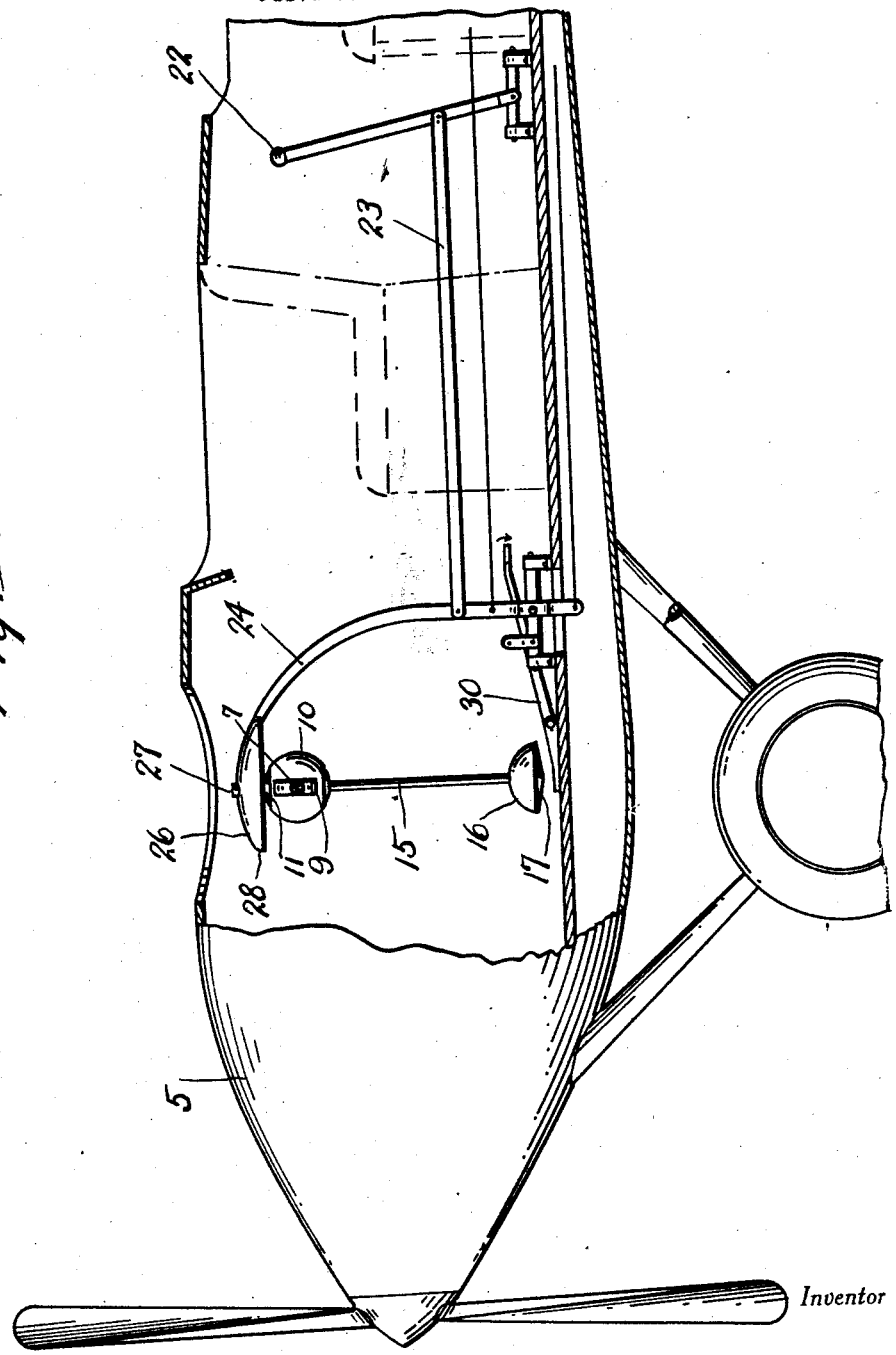

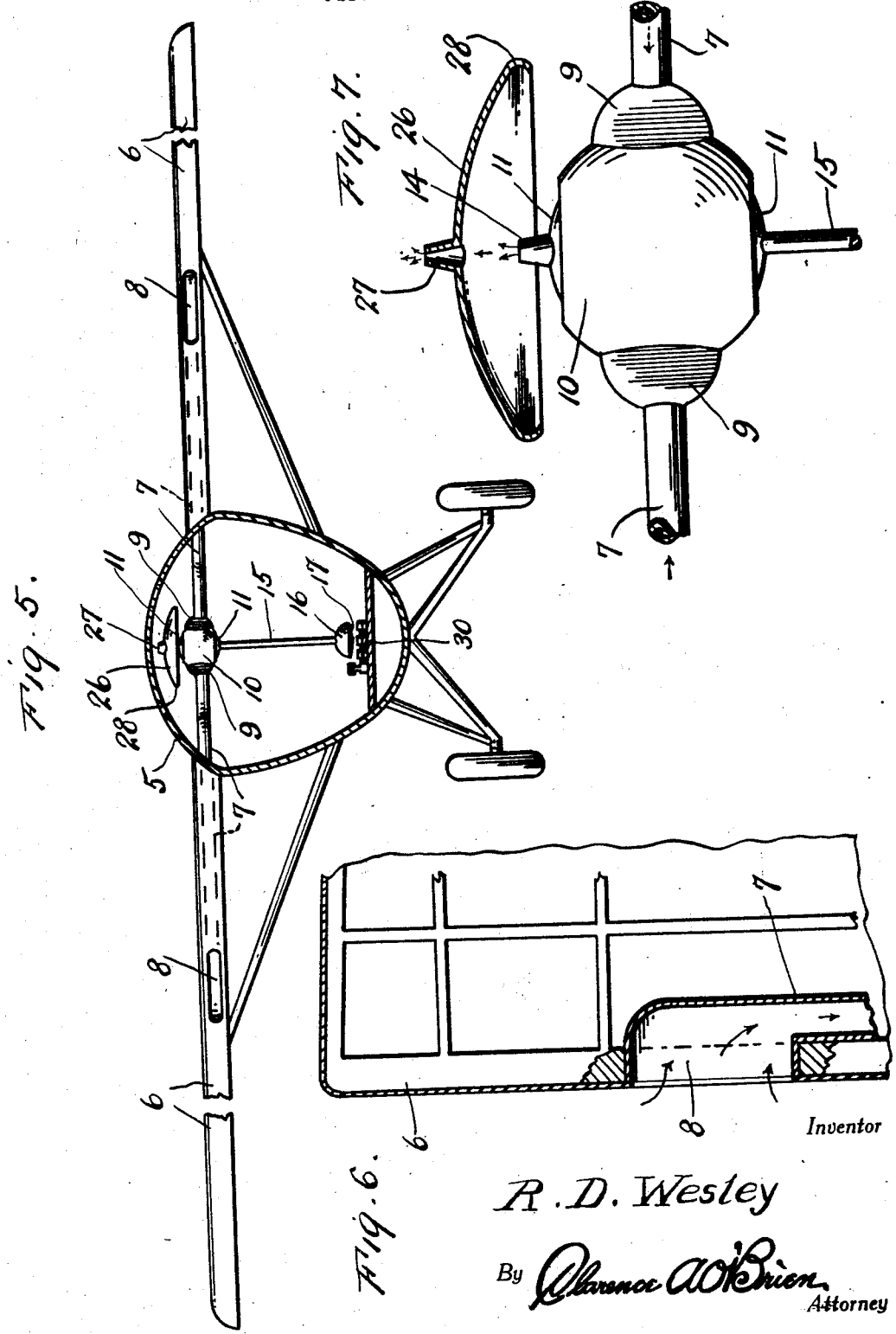

Sept. 23, 1930.  R. D. WESLEY  1,776,378
AEROPLANE CONTROL
Filed Oct. 25, 1929    5 Sheets-Sheet 4
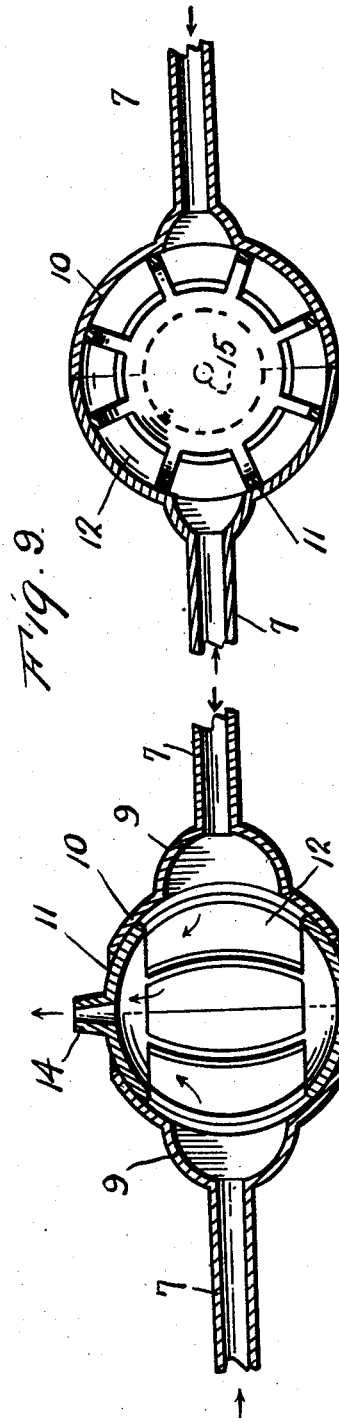
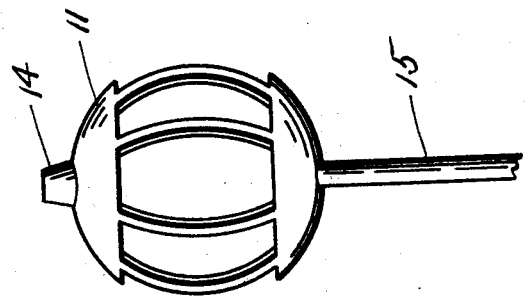
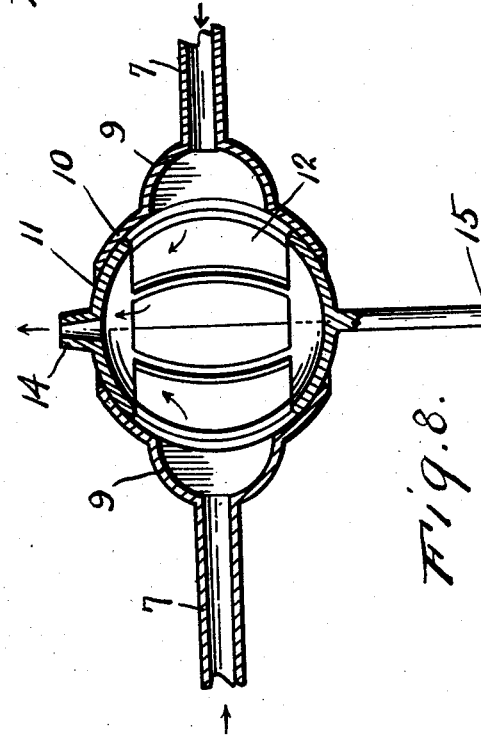
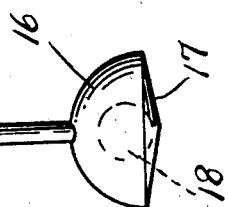
Inventor
R. D. Wesley
By Clarence A. O'Brien
Attorney Sept. 23, 1930.                R. D. WESLEY                 1,776,378
                              AEROPLANE CONTROL
                           Filed Oct. 25, 1929            5 Sheets-Sheet 5
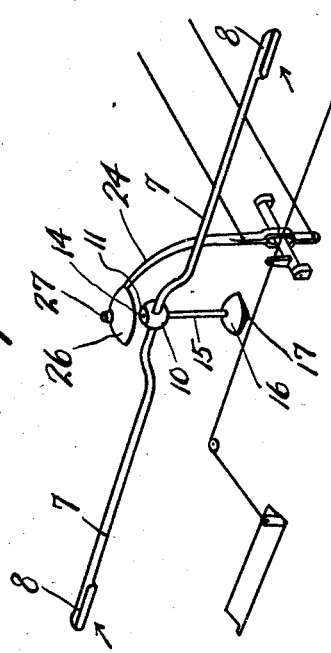
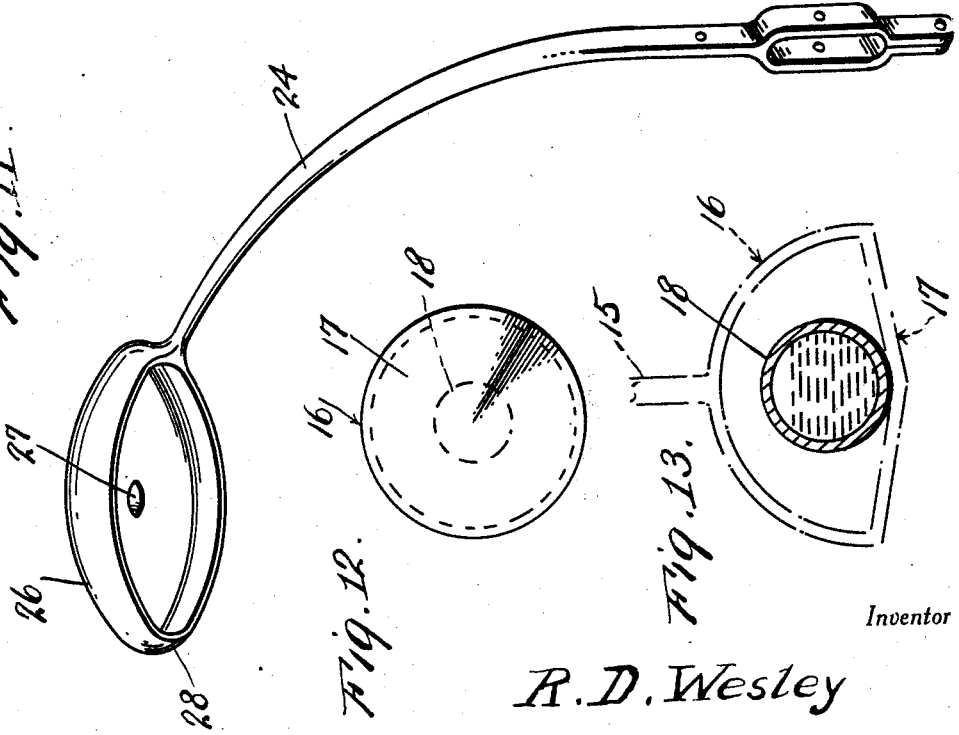
Inventor
R. D. Wesley
By Clarence A. O'Brien
                              Attorney Patented Sept. 23, 1930

1,776,378

UNITED STATES PATENT OFFICE

ROLLAND D. WESLEY, OF NORTON, KANSAS

AEROPLANE CONTROL

Application filed October 25, 1929. Serial No. 402,411.

The present invention relates to a control mechanism for aeroplanes and has for its prime object to provide a structure which will automatically hold the controls of the aeroplane in such a position that the aeroplane will tend to travel at one elevation horizontally making the mechanism particularly useful for blind flying in foggy weather and also permitting stunts to be performed by setting the aeroplane to travel in a wide circle and then the aviator may parachute therefrom and then be landed in the aeroplane after a suitable length of time.

A still further very important object of the invention resides in the provision of a control mechanism of this nature which is automatic in its operation being actuated mainly by a current of air created by the movement of the aeroplane.

A still further very important object of the invention resides in the provision of a mechanism of this nature which is exceedingly simple in construction, inexpensive to manufacture, strong and durable, thoroughly efficient and reliable in use and operation, and otherwise well adapted to the purpose for which it is designed.

With the above and numerous other objects in view as will appear as the description proceeds, the invention resides in certain novel features of construction and in the combination and arrangement of parts as will be hereinafter more fully described and claimed.

In the drawing:

Figure 1 is a longitudinal vertical sectional view through an aeroplane embodying the features of my invention, Figure 2 is a top plan view thereof, Figure 3 is a vertical detail section taken substantially on the line 3—3 of Figure 2, Figure 4 is a front edge view of one of the wings showing the air intake, Figure 5 is a vertical transverse section taken substantially on the line 5—5 of Figure 2, Figure 6 is a fragmentary horizontal section through one of the wings showing the air intake therein, Figure 7 is a detail elevation of the ball and socket mounting of the pendulum, Figure 8 is a sectional view therethrough taken vertically, Figure 9 is a sectional view therethrough taken horizontally, Figure 10 is an elevation of the ball, Figure 11 is a perspective view of the auxiliary joy stick, Figure 12 is a bottom plan view of the pendulum, Figure 13 is a sectional view through the gravity ball used in the pendulum, Figure 14 is a sectional view through the casing at the lower end of the pendulum showing the folding mechanism therefor, and Figure 15 is a diagrammatic view of the apparatus.

Referring to the drawing in detail it will be seen that the numeral 5 denotes an aeroplane fuselage in the present instance provided with wings 6 extending laterally therefrom, this exemplification being of the monoplane type but this is not of the essence of the invention.

Pipes 7 extend from the fuselage transversely through the front portions of the wings 6 and terminate through the front edges thereof in intake 8. The inner ends of the pipes are enlarged as at 9 and merge into a socket 10 in which is movably mounted a ball 11 of hollow construction having a plurality of openings 12 and formed at the top with a nozzle 14, and having depending from the bottom a pendulum shank 15 with a casing 16 formed thereon and the bottom of this casing is in the form of a screw threaded cap 17.

In this casing and on the cap 17 there is a mercury filled gravity ball 18 whereby the pendulum is normally held in a vertical position. The numeral 22 denotes the usual joy stick from an intermediate portion of which forwardly extends a link 23.

This link 23 is pivotally engaged with the joy stick 22 and with an auxiliary joy stick 24. These joy sticks are mounted in the conventional manner. The auxiliary joy stick 24 curves upwardly and forwardly and terminates in a concavo-convex dome 26 with an outlet nozzle rising from the center thereof as at 27.

A depending annular flange is formed on the edge of the dome as is indicated at 28. Now when the aeroplane is moving forwardly in the air it will be seen that air enters through the intake 8 and is forced through the pipe 7 into the ball and socket structure so as to be forced up through the jet or nozzle 14 into the dome 26 impinging against the concave face thereof so as to move the joy stick until the jet or nozzle 27 is alined with the jet or nozzle 14.

The pendulum, of course, always maintains the jet or nozzle 14 pointing straight upwardly that is vertically and therefore there will always be this tendency to actuate the joy stick so as to maintain the aeroplane in horizontal flight.

At times, of course, it will be desirable to make the pendulum portion of the mechanism inactive and this is accomplished by means of a lever 30 adapted to be actuated by the foot of the aviator.

It is thought that the construction, operation, utility and advantages of this invention will now be quite apparent without a more detail description thereof. It is desired, however, to point out that the principles of this control mechanism can be applied to any type of air craft as its actions are natural and the pendulum attached to the ball is governed by the friction between the socket, in other words, while it moves in any direction easily when the machine or plane is off level, it is not absolutely a free swinging pendulum.

The action of the pendulum always directs the air pressure on the dome at the proper place to continually keep the machine level or at the angle the appliance is set for. The speed of the flying machine when in flight is generally steady and continuously, the passage of the air pressure through the ball and socket structure and through the dome tends to hold the control steady and in place. In case of starting the pendulum would have a tendency to swing back or nose the plane down which is perfectly natural on the take off likewise the sudden slowing after contact with the ground, the pendulum would swing forward directing the stick back (that is the natural position in landing after contact with the ground).

The automatic air control structure and stabilizer herein described may be used as either the principal controls or secondary controls and placed in the machine in any position desired. In a biplane, the automatic control could be on one wing and the pilot control could be on the other using two elevators. A suggested arrangement would be the automatic control placed between the passenger's seat and the pilot's seat, the automatic control being primary and attached to the controls of the plane and the pilot's control attached to the automatic in much the same way that dual controls are arranged in planes today.

It is also to be appreciated that this construction may be used on a soar-plane for transportation and be attached to a power plane. The United States Army is flying planes tied together and experimenting along this line. As a military measure, the control could be used in an offensive plane carrying high explosives and the plane would be directed at almost any position from a point outside the range of high powered artillery. The planes would thus become torpedoes of the air and under favorable conditions could be directed quite accurately and of course could be used as gas carriers.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, an aeroplane, a joy stick for controlling the aeroplane, means for collecting air by the forward movement of the aeroplane and using said air to control the joy stick, a pendulum operatively associated with said means for properly directing said air.

2. In an aeroplane, means for collecting air, a pendulum, a hollow ball and socket structure for mounting said pendulum, means for directing the air into said hollow ball and socket structure, a jet rising therefrom to direct the air vertically under practically all conditions, a joy stick terminating into a hood into which the nozzle is adapted to direct air for controlling the joy stick.

3. In an aeroplane, means for collecting air, a pendulum, a hollow ball and a socket structure for mounting said pendulum, means for directing the air into said hollow ball and socket structure, a jet rising therefrom to direct the air vertically under practically all conditions, a joy stick terminating into a hood into which the nozzle is adapted to direct air for controlling the joy stick, said hood being formed with an upwardly directed nozzle so that there is a tendency that said nozzles be maintained in alinement with each other.

4. In an aeroplane, means for collecting air, a pendulum, a hollow ball and socket structure for mounting said pendulum, means for directing the air into said hollow ball and socket structure, a jet rising therefrom to direct the air vertically under practically all conditions, a joy stick terminating into a hood into which the nozzle is adapted to direct air for controlling the joy stick, said hood being formed with an upwardly directed nozzle so that there is a tendency that said nozzles be maintained in alinement with each other, said pendulum including a shank terminating in a casing, the bottom of which is in the form of a screw threaded cap.

5. In an aeroplane, means for collecting air, a pendulum, a hollow ball and socket structure for mounting said pendulum, means for directing the air into said hollow ball and socket structure, a jet rising therefrom to direct the air vertically under practically all conditions, a joy stick terminating into a hood into which the nozzle is adapted to direct air for controlling the joy stick, said hood being formed with an upwardly directed nozzle so that there is a tendency that said nozzles be maintained in alinement with each other, said pendulum including a shank terminating in a casing, the bottom of which is in the form of a screw threaded cap, a mercury filled ball in the casing.

6. In an aeroplane, means for collecting air, a pendulum, a hollow ball and socket structure for mounting said pendulum, means for directing the air into said hollow ball and socket structure, a jet rising therefrom to direct the air vertically under practically all conditions, a joy stick terminating into a hood into which the nozzle is adapted to direct air for controlling the joy stick, said hood being formed with an upwardly directed nozzle so that there is a tendency that said nozzles be maintained in alinement with each other, said pendulum including a shank terminating in a casing, the bottom of which is in the form of a screw threaded cap, a mercury filled ball in the casing, a rockably mounted lever in the aeroplane adapted to be actuated against the casing to make the pendulum inoperative.

7. In combination, an aeroplane, a joy stick for controlling the aeroplane terminating in a hood, means for collecting air by the forward movement of the aeroplane and directing said air against the hood to control the joy stick.

In testimony whereof I affix my signature.

ROLLAND D. WESLEY.